(12) United States Patent
Zhou et al.

(10) Patent No.: US 9,331,780 B1
(45) Date of Patent: May 3, 2016

(54) SYSTEMS AND METHODS FOR ADAPTIVE ENERGY UTILIZATION OF OPTICAL INTERCONNECTION NETWORKS

(71) Applicant: Google Inc., Mountain View, CA (US)

(72) Inventors: Xiang Zhou, Los Altos, CA (US); Hong Liu, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 31 days.

(21) Appl. No.: 14/274,758

(22) Filed: May 11, 2014

(51) Int. Cl.
*H04B 10/12* (2006.01)
*H04B 10/25* (2013.01)
*H04B 10/27* (2013.01)

(52) U.S. Cl.
CPC ............... *H04B 10/25* (2013.01); *H04B 10/27* (2013.01)

(58) Field of Classification Search
CPC .................... H04B 10/2575; H04B 10/25752; H04B 10/1123; H04B 10/54
See application file for complete search history.

(56) References Cited

U.S. PATENT DOCUMENTS

| | | | |
|---|---|---|---|
| 7,099,597 B2 | 8/2006 | Saunders et al. | |
| 2004/0037569 A1* | 2/2004 | Kamalov et al. | 398/162 |
| 2005/0213966 A1* | 9/2005 | Chown et al. | 398/27 |
| 2009/0269055 A1* | 10/2009 | Butler et al. | 398/27 |
| 2012/0076502 A1 | 3/2012 | Swanson et al. | |
| 2013/0209093 A1* | 8/2013 | Tanimura et al. | 398/32 |
| 2013/0294763 A1* | 11/2013 | Bruno | 398/16 |

FOREIGN PATENT DOCUMENTS

GB 2 424 134 A 9/2006

OTHER PUBLICATIONS

Abts, Dennis, et al., Energy Proportional Datacenter Networks, Proceedings of the International Symposium on Computer Architecture, ACM (2010), pp. 338-347.
Castoldi, Piero, et al. Energy Efficiency and Scalability of Multiplane Optical Interconnection Networks for Computing Platforms and Data Centers, Optical Society of America, OFC 2012, paper OW3J.4.
Cole, Chris, et al., Higher-Order Modulation for Client Optics, IEEE Communications Magazine, pp. 5057, Mar. 2013.
Heller, Brandon, et al., ElasticTree: Saving Energy in Data Center Networks, In Proceedings of the $7^{th}$ USENIX Symposium on Networked System Design and Implementation (NSDI),pp. 249-264, ACM, 2010.
Li, Jian, et al., Thrifty Interconnection Network for HPC Systems, In ICS 01909: Proceedings of the 23rd International Conference on Supercomputing, pp. 505-506, 2009.
Mahadevan, Priya, et al. Energy Aware Network Operations, In INFOCOM'09: Proceedings of the 28th IEEE International Conference on Computer Communications Workshops, pp. 25-30, 2009.

* cited by examiner

*Primary Examiner* — Dzung Tran
(74) *Attorney, Agent, or Firm* — Edward A. Gordon; Foley & Lardner LLP

(57) ABSTRACT

This disclosure provides systems, methods, and apparatus for an energy efficient communication system. The communication system can include a transmitter, a receiver and a communication link for communicating data between the transmitter and the receiver. In some implementations, the receiver determines a signal quality parameter (SQP) value of the received data, and communicates the SQP value to the transmitter. In some implementations, the transmitter adjusts one or more operational parameters of the transmitter to reduce power based on the received SQP value being less than a threshold value. In some implementations, the receiver also adjusts one or more operational parameters of the receiver based on the SQP value being less than a threshold value. In some implementations, the receiver can communicate the SQP value to the transmitter over out-of-band communication links.

20 Claims, 6 Drawing Sheets

SYSTEMS AND METHODS FOR ADAPTIVE ENERGY UTILIZATION OF OPTICAL INTERCONNECTION NETWORKS

TECHNICAL FIELD

This disclosure relates to the field of communication networks, and in particular to communication transceivers.

DESCRIPTION OF THE RELATED TECHNOLOGY

Communication networks can include a number of computing devices, such as servers, communicating over an interconnection network. The power consumption of a communication network as a whole can increase considerably with the increase in the number of computing devices and the corresponding increase in interconnection links connecting the computing devices.

SUMMARY

According to one aspect, the subject matter described in this disclosure relates to an optical communication system including an optical transmitter communicably coupled to an optical link and an optical receiver communicably coupled to the optical link. The optical transmitter is configured to transmit data over the optical link, receive a signal quality parameter (SQP) value indicating a signal quality of the data transmitted over the optical link, and dynamically adjust one or more operational parameters of the optical transmitter to reduce power consumption in response to the received SQP value. The optical receiver can be configured to receive data transmitted by the transmitter over the optical link, generate the SQP value, and communicate the SQP value to the optical transmitter.

According to another aspect, the subject matter described in this disclosure relates to a method for dynamically adjusting one or more operational parameters of a communication system including a transmitter and a receiver communicating over a communication link. The method includes transmitting data from the transmitter to the receiver over the communication link, receiving at the transmitter a signal quality parameter (SQP) value from the receiver indicating a signal quality of the data transmitted over the communication link, and dynamically adjusting, at the transmitter, one or more operational parameters of the transmitter to reduce power consumption of the transmitter in response to the received SQP value.

According to another aspect, the subject matter described in this disclosure relates to a method for dynamically adjusting one or more operational parameters of a communication system including a transmitter and a receiver communicating over a communication link. The method includes transmitting data from the transmitter over the communication link, receiving at the receiver the data transmitted over the communication link, determining at the receiver a signal quality parameter (SQP) value indicating a signal quality of the data transmitted over the communication link, receiving at the transmitter the SQP value from the receiver, dynamically adjusting, at the transmitter, one or more operational parameters of the transmitter to reduce power consumption of the transmitter in response to the received SQP value, and dynamically adjusting, at the receiver, one or more operational parameters of the receiver to reduce power consumption of the receiver based on the SQP value.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

DETAILED DESCRIPTION

The various concepts introduced above and discussed in greater detail below may be implemented in any of numerous ways, as the described concepts are not limited to any particular manner of implementation. Examples of specific implementations and applications are provided primarily for illustrative purposes.

Figure 1:
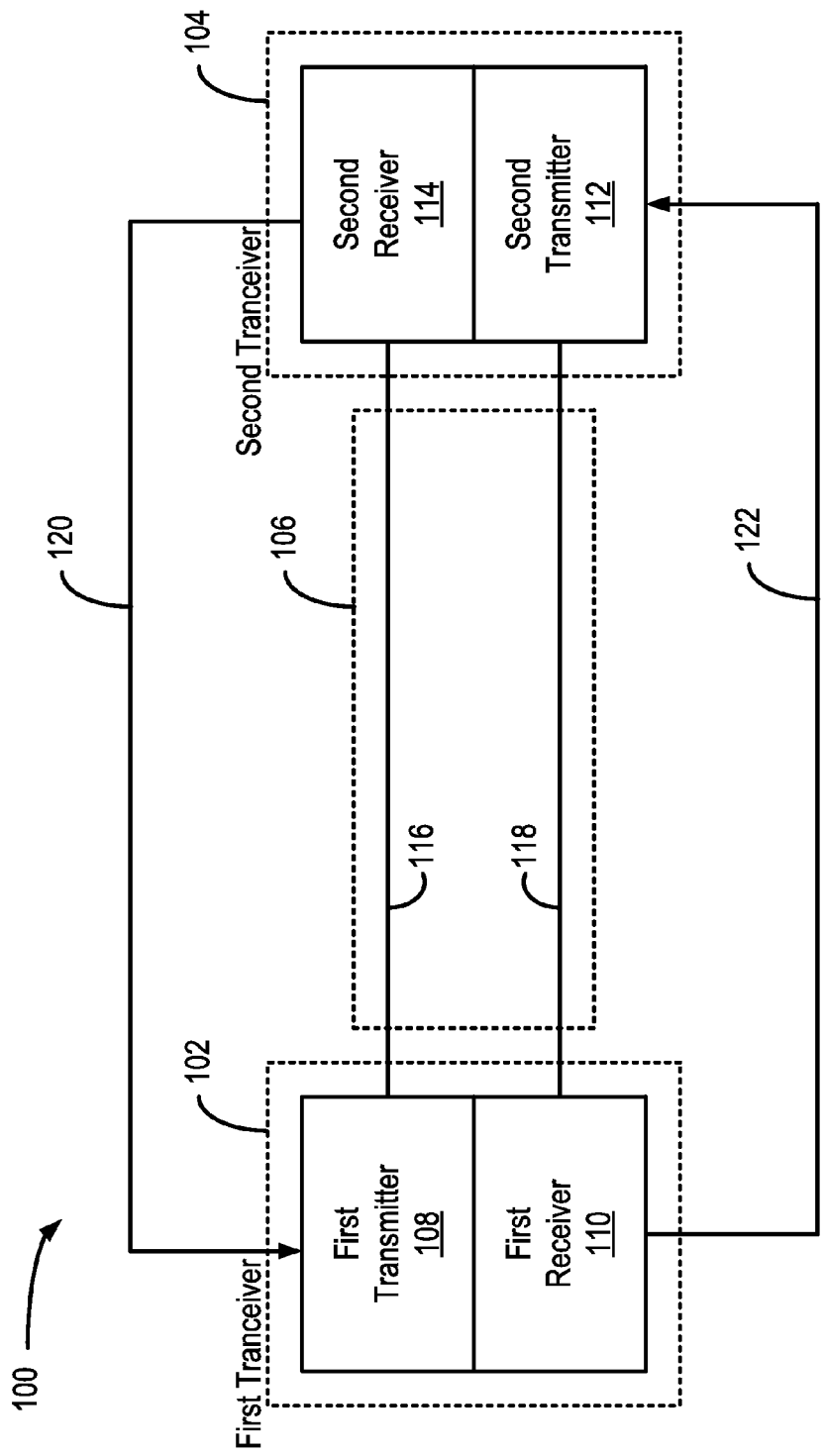
FIG. 1 shows an example communication system.

FIG. 1 shows an example communication system 100. In particular, the communication system 100 includes a first transceiver 102 communicating with a second transceiver 104 over a communication link 106. Each of the first transceiver 102 and the second transceiver 104 can be coupled to their respective devices such as, network switches, computers, data-storage devices, network interface cards, host-bus adapters, etc. The first and the second transceivers 102 and 104 can provide communication between their respective devices. In some implementations, the communication link 106 can include wired or wireless communication links. In some implementations, the communication link 106 can include optical links.

The first transceiver 102 can include a first transmitter 108 and a first receiver 110. Similarly, the second transceiver 104 can include a second transmitter 112 and a second receiver 114. The first transmitter 108 can communicate with the second receiver 114 over a first communication link 116, while the second transmitter 112 can communicate with the first receiver 110 over a second communication link 118. In some implementations, the first transceiver 102 and the second transceiver 104 can communicate over out-of-band links. For example, the second receiver 114 can communicate with the first transmitter 108 over a first out-of-band communication link 120. Likewise, the first receiver 110 can communicate with the second transmitter 112 over a second out-of-band communication link 122. In some implementations, the first and the second out-of-band communication links 120 and 122 can be utilized to communicate management data associated with the communication system 100.

Figure 2:
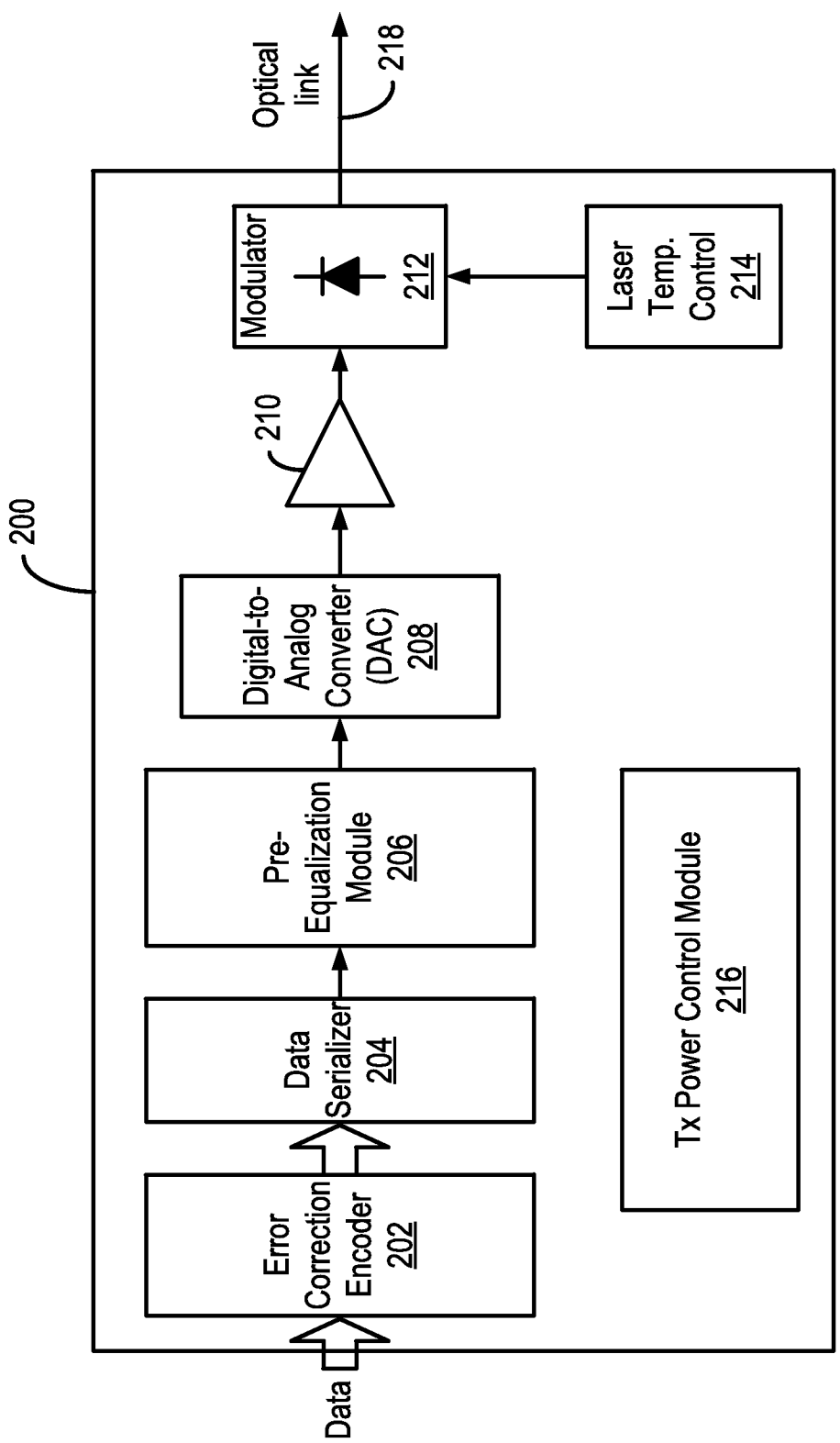
FIG. 2 shows a block diagram of an example transmitter.
Figure 3:
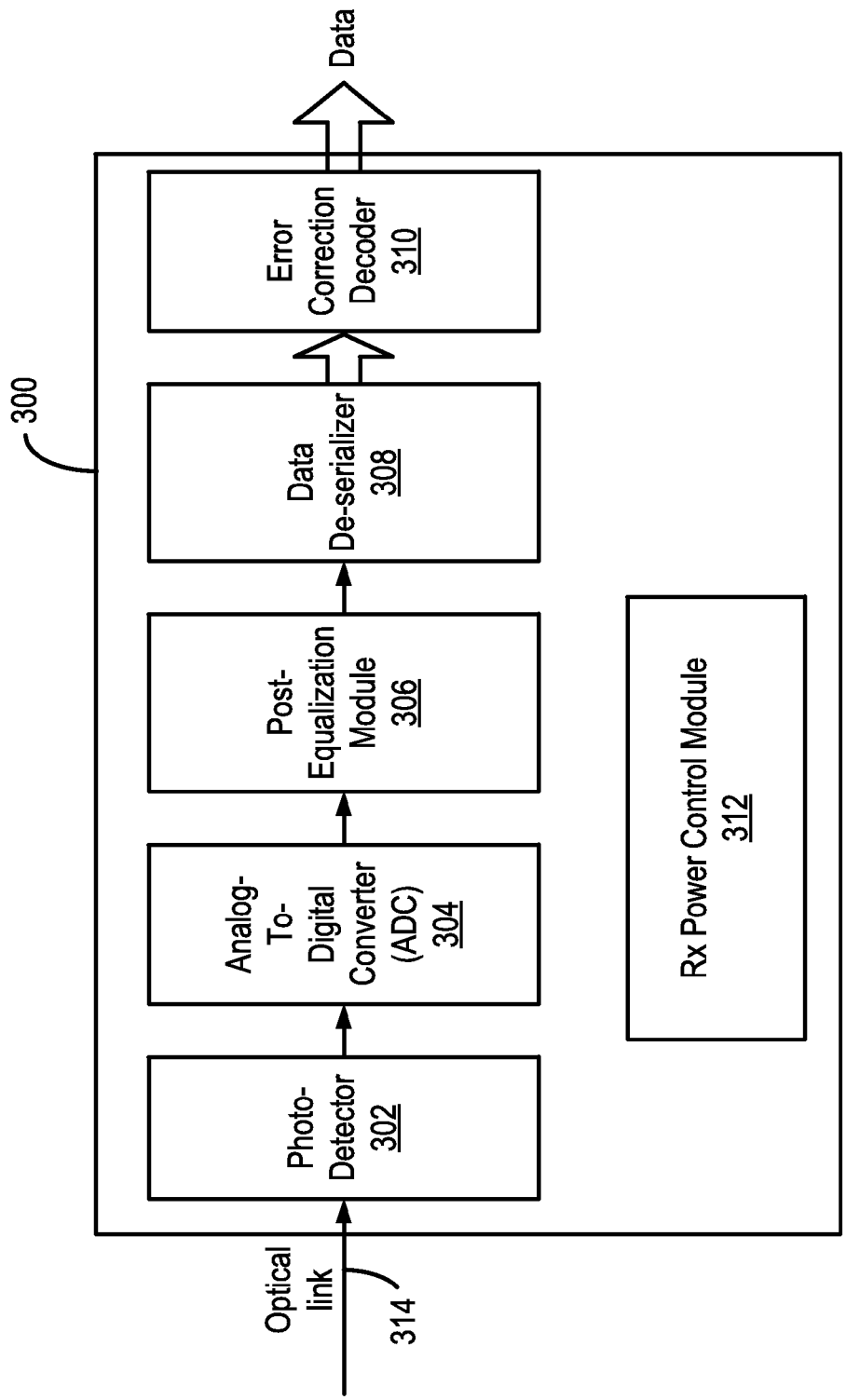
FIG. 3 shows a block diagram of an example receiver.

FIGS. 2 and 3 show block diagrams of an example transmitter 200 and an example receiver 300, respectively. In particular, the transmitter 200 and the receiver 300 can be utilized for adaptive energy utilization in communication systems. In some implementations, the transmitter 200 and the receiver 300 can be utilized for communicating data over a communication system. For example, in some implementations, the transmitter 200 can be utilized for implementing the first and the second transmitters 108 and 112 in the communication system 100 shown in FIG. 1. In some implementations, the receiver 300 can be utilized for implementing the first and the second receivers 110 and 114 in the communication system 100 shown in FIG. 1. In some implementations, the transmitter 200 and the receiver 300 shown in FIGS. 2 and 3 can be configured communicate data over optical communication links. However, a person skilled in the art would appreciate that the transmitter 200 and the receiver 300 can be readily adapted for communicating data over other communication links such as wireless communication links, electrical communication links, etc.

The transmitter 200 can include an error correction encoder 202, a data serializer 204, a pre-equalization module 206, a digital-to-analog converter (DAC) 208, a modulation driver 210, a data modulator 212, a laser temperature controller 214, and a transmitter power control module 216. While not shown, the transmitter 200 can include additional components such as clock generators, phase-locked-loop circuits, digital/analog filters, power supplies, optical lenses and interfaces, etc.

The error correction encoder 202 can encode received data to generate error correction encoded data. In some implementations, the error correction encoded data, when received by a receiver can allow the receiver to detect errors that may have been introduced in the received data, and, in some instances, correct the errors without requesting retransmission of the data. In some implementations, the error correction encoder 202 can utilize forward error correction (FEC) codes for encoding data. The FEC codes encode the original data with additional error detection and correction information (e.g., parity bits). At the receiver, a decoder can utilize the additional error detection and correction information to detect and correct errors that may have been introduced in the received data during transmission.

The FEC codes can include various codes such as linear block codes and convolutional codes. Linear block codes can process fixed size blocks of bits or data symbols and can generate fixed sized encoded data, while convolutional codes can process bit or data symbol streams of arbitrary lengths and can generate encoded data streams of arbitrary lengths. In some implementations, linear block codes can include hamming codes, binary codes (e.g., Bose-Chaudhuri-Hocqueaghem (BCH) code), and non-binary codes (e.g., Reed-Solomon codes).

In some implementations, the FEC codes can be implemented using hard-decision (HD) algorithms or soft-decision (SD) algorithms. With HD algorithms, the decoder makes a firm decision on whether a received signal is a "1" or a "0" based on a comparison with a threshold value. The redundancy bits transmitted by the encoder provide no further information regarding the likelihood that the bit has a particular value. As a result, the decoder, upon receiving a bit, decodes the bit to either a "1" or a "0" based only on the comparison to the threshold value. On the other hand, with the SD algorithms, the redundancy bits also include information regarding the reliability of a decision of whether a received bit is a "1" or a "0". For example, the reliability information can, in some implementations, include a probability or confidence measure for the bit to be a "0" or a "1". The decoder can take into account the reliability information to determine whether a received bit is a "0" or a "1". In some implementations, the SD algorithms can provide better error detection and correction than the HD algorithms, but at the cost of higher coding overhead and of greater processing needs.

In some implementations, the error correction encoder 202 can receive control signals from the transmitter power control module 216 to adjust one or more operational parameters of the error correction encoder 202. In some implementations, the error correction encoder 202, in response to control signals received from the transmitter power control module 216, may cease encoding the data. In some other implementations, in response to the control signals, the error correction encoder 202 may select a particular code for encoding data. For example, based on the received control signals, the error correction encoder 202 may select the binary code (e.g., BCH code) over the hamming code to encode data. In some implementations, the error correction encoder 202, based on the controls signals, may select an SD algorithm or an HD algorithm for encoding the data. In some implementations, based on the received control signals, the error correction encoder 202 may select a convolution code over a block code for encoding data. In some implementations, the error correction encoder 202 may be implemented using a digital signal processor. In some other implementations, the error correction encoder 202 may be implemented using field programmable gate arrays (FPGAs) or application specific integrated circuits (ASICs).

The encoded data generated by the error correction encoder 202 is provided to the data serializer 204. The data serializer 204 converts blocks of data that may be output from the error correction encoder 202 into a stream of data bits. In some implementations, the data serializer 204 can be implemented using shift registers. For example, in some implementations, a shift register having the same width (in bits) as the output of the error correction encoder 202 can be utilized to store the encoded data in parallel. The encoded data can then be shifted out in serial order from the shift register at a predetermined clock frequency. In some implementations, the frequency with which the serial data is output by the data serializer 204 can be based on the transmission frequency of the transmitter 200.

The pre-equalization module 206 carries out transmission link pre-equalization on the serial data. In particular, the pre-equalization process can compensate for the degradation that the transmitted data may suffer during transmission to the receiver over a transmission link. For example, data transmitted over optical links may be degraded due to optical attenuation and chromatic dispersion. In some implementations, the pre-equalization process can utilize an inverse of a link transfer function representative of the transmission link to process the data before transmission. For example, if the link transfer function of a transmission link can be represented by C(f), then the pre-equalizer 206 can multiply the data to be transmitted over the transmission link with the inverse, i.e., 1/C(f), transfer function. In some implementations, the inverse transfer function can be implemented using digital finite impulse response (FIR) filters.

The pre-equalizer 206 can receive control signals from the transmitter power control module 216 to adjust one or more operational parameters of the pre-equalizer 206. In some implementations, in response to the control signals, the pre-equalizer 206 may refrain from pre-equalizing the data. In some implementations, in response to the control signals, the pre-equalizer 206 can power down or power up. In some implementations, the pre-equalizer 206, based on the control signals, select the number of taps for the FIR filters utilized for the pre-equalization process. For example, in some implementations, the pre-equalizer 206 can reduce the number of taps employed in the FIR filter to reduce the power consumption of the pre-equalizer 206 at the cost of reduced effectiveness of the pre-equalization process. In some implementations, the pre-equalizer 206 can be implemented using FPGAs, ASICs, or DSPs.

The data stream output by the pre-equalization module 206 can be converted from digital to analog signals by the DAC 208. The DAC 208 can convert the streams of bits that form the data stream output by the pre-equalization module 206 into analog electrical signals that are representative of the streams of bits. In some implementations, the DAC 208 can output analog signals that swing between two voltages (e.g., 0 V and 5 V), where one of the two voltage values represents a "0" while the other of the two voltage values represents the bit "1". In some implementations, the values of the two voltages can be selected based on the requirements of the driver 210. In some implementations, the DAC 208 can be implemented using various architectures such as, but not limited to, sigma-delta DACs, binary weighted DACs, resistor ladder DACs, successive approximation DACs, etc. In some implementations, the DAC 208 can output the analog signals at a particular sampling frequency. Generally, the accuracy of the analog signals output by the DAC 208 can increase with an increase in the sampling frequency of the DAC 208. In some implementations, however, a higher sampling frequency can increase the power consumption of the DAC 208.

In some implementations, the DAC 208 can receive control signals from the transmitter power control module 216. In particular, the DAC 208 can receive control signals that can instruct the DAC 208 to vary the sampling frequency of the DAC 208. For example, in some implementations, the DAC 208, in response to the control signals received from the transmitter power control module 216 can reduce the sampling frequency of the DAC 208. In some implementations, the control signals received from the transmitter power control module 216 can include a sampling frequency, or a range of sampling frequencies, which can be utilized by the DAC 208 to output the analog signals.

The transmitter 200 also includes a driver 210 that receives the analog signals output by the DAC 208. The driver 210 generates modulation voltage signals that are a function of the analog signals output by the DAC 208. In some implementations, the driver 210 can amplify the analog signals to generate amplified modulation voltage signals. In some implementations, the driver 210 can be implemented using radio frequency capable transistor based amplifiers.

In some implementations, the output voltage swing and/or the amplification factor of the driver 210 can be adjustable. In some implementations, the driver 210 can receive control signals from the transmitter power control module 216 to adjust the output voltage swing of the modulation voltage signal or to adjust the amplification factor of the driver 210.

The modulation voltage generated by the driver 210 can be supplied to the modulator 212. The modulator 212 can utilize the modulation voltage received from the driver 210 to modulate a carrier signal and transmit the carrier signal over the transmission link 218. In some implementations, as shown in FIG. 2, the modulator 212 can modulate an optical signal generated by an optical source such as a laser diode. The modulation voltage can be utilized to vary one or more parameter of the optical signal, such as the amplitude, the phase, the polarization, etc. In some implementations, the modulator 212 can employ direct modulation techniques, in which a current supplied to the laser diode is varied based on the modulation voltage. In some other implementations, the modulator 212 can employ external modulation techniques, in which the current to the laser diode is maintained substantially constant so that the laser diode can generate a continuous wave (CW) optical signal, and one or more optical parameters of the CW optical wave can be varied based on the modulation voltage. In some implementations, Mach-Zehnder type interferometers can be utilized for implementing the modulator 212 using external modulation techniques.

In some implementations, the modulator 212 can receive control signals from the transmitter power control module 216 for varying one or more operational parameters of the modulator 212. For example, in some instances where the modulator 212 employs direct modulation techniques, the modulator 212, based on the controls signals, can vary the amplitude of the current supplied to the laser diode. In other instances where the modulator 212 employs external modulation techniques, the modulator 212, based on the control signals, can vary the amplitude of the modulation voltage.

The transmitter 200 can also include a laser temperature controller 214 for controlling the temperature of the laser diode used in the modulator 212. In some implementations, the temperature controller 214 can include a heat pump that extracts heat generated from the laser diode and dissipates the heat into the environment. In some implementations, the heat pump may include a coolant and a pump for circulating the coolant. In some implementations, the heat pump may include a thermoelectric cooler (TEC), which utilizes the Peltier effect for dissipating heat generated by the laser diode. The temperature controller 214 may include additional control circuitry for regulating the temperature of the laser diode.

In some implementations, the temperature controller 214 can receive control signals from the transmitter power control module 216. In some implementations, in response to receiving the controls signals, the temperature controller 214, can vary one or more operational parameters for varying the power consumption of the temperature controller 214. For example, in some implementations, the temperature controller 214 can receive control signals for reducing the power consumption of the temperature controller 214. In some implementations, the temperature controller 214 can stop or start the cooling of the laser diode based on the control signals received from the transmitter power control module 216.

The transmitter power control module 216 can control the amount of power consumed by the transmitter 200. In some implementations, the transmitter power control module 216 can control the power consumption of individual components of the transmitter 200. In particular, the transmitter power control module 216 can control the power consumption of the error correction encoder 202, the pre-equalization module 206, the DAC 208, the driver 210, the modulator 212 and the laser temperature controller 214. In some implementations, the transmitter power control module 216 can receive a value for a signal quality margin, and can alter the power consumption of the transmitter based on the received value of the signal quality margin. The operation of the transmitter power control module with respect to the received signal quality parameter is discussed further below.

As mentioned above, FIG. 3 shows an example receiver 300. The receiver includes a photo-detector circuit 302, an analog-to-digital converter (ADC) 304, a post-equalization module 306, a data de-serializer 308, an error correction decoder 310, and a receiver power control module 312. The receiver 300 can receive an optical signal transmitted by a transmitter over an optical link 314. For example, the receiver 300 may receive the optical signals generated by the transmitter 200 shown in FIG. 2. The receiver 300 can process the received optical signals to extract data encoded within the optical signals. While not shown, the receiver 300 can include additional components such as clock generators, phase-locked-loop circuits, digital/analog filters, power supplies, optical lenses and interfaces, etc.

The optical signals received by the receiver 300 are input to the photo-detector circuit 302. The photo-detector circuit 302 can convert optical signals received over the optical link 314 into corresponding electrical signals. In some implementations, the photo-detector circuit 302 can include photo-diodes for generating electrical currents in response to the intensity of the received optical signal. Additional circuitry, such as transimpedance amplifiers, can convert the electrical current into a voltage signal, which can be provided to other components of the receiver 300. In some implementations, the photo-diodes can include, without limitation, silicon, gallium-arsenide, or indium-gallium-arsenide P-N junction photo-diodes.

The voltage signal generated by the photo-detector circuit 302 is received by the ADC 304. The ADC 304 can convert the analog electrical signals into digital data. For example, the ADC 304 can convert the analog voltage signals generated by the photo-detector circuit 302 into a stream of digital bits. The ADC 304 can sample the analog voltage signals at a particular sampling rate and quantize the sampled voltages using K bits of data. In some implementations, the sampling rate of the ADC 304 can be at least twice the highest relevant frequency of the analog voltage signal. In some implementations, the sampling rate and the number of bits K used for quantizing the sampled voltage signals can be varied during operation.

In some implementations, the ADC 304 can receive control signals from the receiver power control module 312. In some implementations, in response to the control signals, the ADC 304 can dynamically change one or more operational parameters of the ADC 304. For example, in some implementations, the ADC 304, in response to the control signals, may reduce the sampling rate of the ADC 304. In some other implementations, the ADC 304, in response to the controls signals, may vary the number of bits K utilized for quantizing the sampled voltage.

The stream of digital bits output by the ADC 304 can be received by the post-equalization module 306. The post-equalization module 306 can correct for degradation of the received data due to optical attenuation and chromatic dispersion caused due to the transmission over the transmission links, such as, for example, the optical link 314. Generally, the post-equalization module 304 can be used to improve the bandwidth of the receiver. In some implementations, the post-equalization module 304 can include one or more FIR filters that can correct for data degradation. For example, the received data may become temporally distorted over the transmission link. The FIR filters with multiple taps can be utilized to mitigate the temporal distortions and reshape the received data. In some implementations, the effectiveness of the post-equalization module 306 can be increased by increasing the number of taps utilized by the FIR filters. In some implementations, increasing the number of taps, however, can result in an increase in the power consumption of the post-equalization module 306. In some implementations, the post-equalization module 306 can dynamically alter the number of taps utilized by the FIR filters.

The post-equalization module 306 can receive control signals from the receiver power control module 312. The post-equalization module 306, in response to the control signals received by the receiver power control module 312, may vary the number of taps utilized by the FIR filters used for processing the received data. In some implementations, the post-equalization module 306 may reduce the number of taps utilized by the FIR filters to reduce the power consumption of the pre-equalization module 306. In some other implementations, the post-equalization module 306 may increase the number of taps utilized by the FIR filters to reduce data degradation at the expense of increased power consumption.

The output of the data stream processed by the post-equalization module 306 can be received by the data de-serializer 308. The data de-serializer can convert a stream of data bits into data blocks of specified length. For example, the de-serializer 308 can convert the received data stream into data blocks, and provide the data blocks to the error correction decoder 310. In some implementations, the de-serializer may be bypassed if the error correction decoder 310 processes a stream of data instead of blocks of data.

The error correction decoder 310 decodes data received from the data de-serializer 308. The error correction decoder 310 also can detect, and if possible correct, errors in the received data. In some implementations, the error correction decoder 310 can determine the signal-to-noise-ratio (SNR) of the received data. As mentioned above, the data received by the receiver 300 can be encoded using error correction codes. The error correction code used for encoding the data can also be used by the error correction decoder 310 to decode the received data. For example, if the received data were encoded using a linear block error correction code (e.g., hamming codes, BCH codes, etc.), the error correction decoder 310 could also use the linear block error correction code to decode the received data. Further, the error correction decoder 310 may use SD algorithms for deciding whether a received bit is a "0" or a "1" if additional reliability information is included in the redundancy bits generated by the encoder. Otherwise, the error correction decoder 310 can use HD algorithms to make bit value decisions.

In some implementations, the error correction decoder 310 can receive control signals from the receiver power control module 312. In some implementations, the error correction decoder 310, in response to receiving control signals can alter one or more operation parameters of the error correction decoder 310. For example, in some implementations, the error correction decoder 310 can cease to decode the received data. Not decoding the received data may be needed when the received data is not encoded with error correction codes. In some implementations, the error correction decoder 310, in response to the control signals may select a particular code for decoding the received data. For example, based on the received control signals, the error correction decoder 310 may select the binary code (e.g., BCH code) for decoding the received data. For example, based on the received control signals, the error correction decoder 310 may select convolution codes over block codes for decoding data. In some implementations, where the block codes allow iterative decoding, the error correction decoder 310 may improve signal quality by performing more iterations for decoding the block encoded received data. In some implementations, increasing the number of iterations may increase the power consumption of the error correction decoder 310. In some implementations, based on the control signals, the error correction decoder 310 may utilize either an HD or an SD algorithm for decoding the received data.

In some implementations, the error correction decoder 110 can determine a signal quality of the data received over the optical link 314. In some implementations, the receiver 110 can quantify the signal quality of the received data and communicate the quantified signal quality to the receiver power control module 312. The receiver power control module 312, as discussed further below in relation to FIG. 4, can utilize the quantified signal quality to adjust the power consumption of at least the receiver 300.

Figure 4:
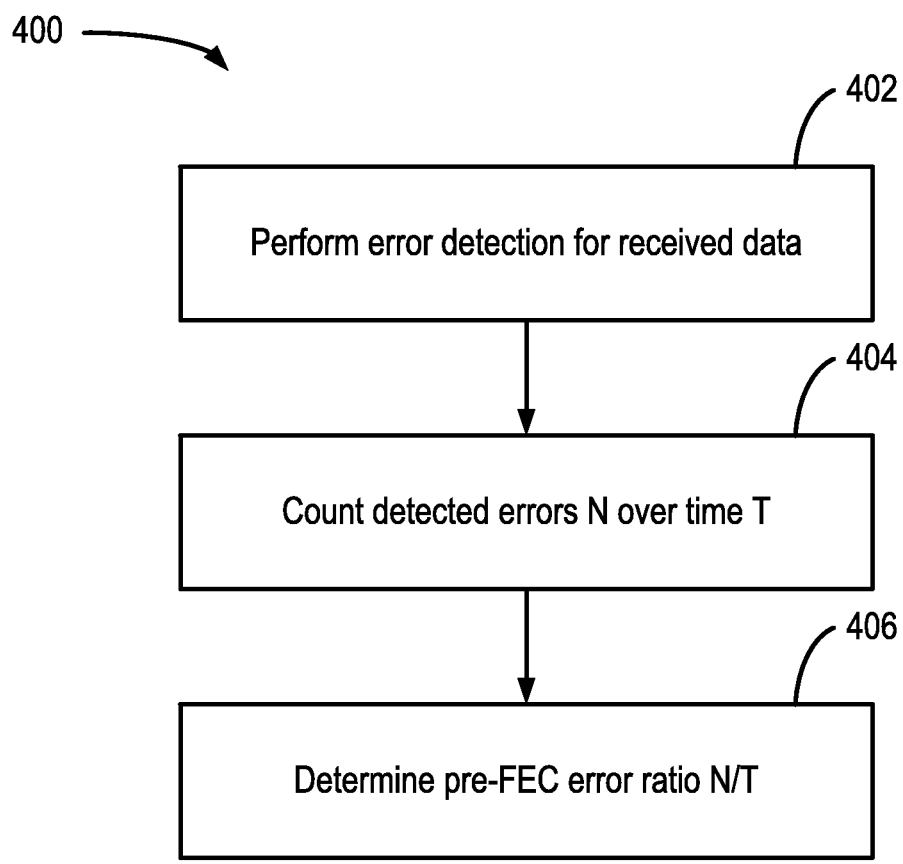
FIG. 4 shows an example process for determining signal quality of data received at a receiver.

FIG. 4 shows an example process 400 for determining signal quality of data received at a receiver. In some implementations, the process 400 can be performed by the error correction decoder 310 of the receiver 300 shown in FIG. 3. In some implementations, the process 400 can be performed by the error correction decoder 310 in combination with the receiver power control module 312 of the receiver 300. The process 400 includes performing error detection for received data (stage 402), counting detected errors N over a time period T (stage 404), and determining pre-error correction error ratio N/T (stage 406).

Referring to FIGS. 2-4, the process 400 includes performing error detection for received data (stage 402). As discussed above in relation to FIG. 3, the error correction decoder 310 can decode the received data using error correction codes. One aspect of decoding the encoded received data can include detecting errors in the received data. For example, the error correction decoder 310 can utilize the appropriate error correction code to determine whether a received bit is a "0" or a "1" and whether the received bit is incorrect (i.e., received in error). In some implementations, in performing the error detection, the decoder can use an HD algorithm or an SD algorithm based on whether additional reliability information regarding the values of the received bits is included in the redundancy bits generated by the encoder.

The process 400 also includes counting detected errors N over a time period T (stage 404). Upon detecting an error, which typically identifies a bit being received in error, the decoder, such as the error correction decoder 310, can maintain a count of the number of errors detected. In addition, the error count can be maintained over a pre-determined time period T (e.g., between about 1 s to about 100 s). In some implementations, the decoder can restart the error count N every T seconds. In some implementations, the decoder can maintain a moving error count N for the last T seconds. In some implementations, a detected error is counted towards the error count N even if the decoder is successful in correcting the error using the redundancy bits encoded by the encoder. In some implementations, a detected error, if successfully corrected by the decoder, is not counted towards the error count N.

The process 400 also includes determining a pre-error correction ratio N/T (stage 406). In some implementations, the decoder can quantify the signal quality of the data received by determining the pre-error correction ratio: N/T. The pre-error correction ratio can provide an estimation of the errors that would be introduced in the received data in the absence of the error correction encoding and decoding. The pre-error correction ratio can also provide an estimate of the quality of the transmission link, in terms of noise levels, over which the data is received. In some implementations, the error correction decoder 310 can provide the pre-error correction ratio N/T to the receiver power control module 312. In some implementations, the error correction decoder 310 may not determine the pre-error correction ratio N/T and instead provide the error count N to the receiver power control module 312, which can use the error count N to determine the pre-error correction ratio N/T.

In some implementations, the pre-error correction ratio can be used as a signal quality parameter (SQP) of the communication system. The value of the SQP determined, for example using the process 400 discussed above, can be compared to a threshold SQP value. The threshold SQP value can represent the specified acceptable SQP value for the communication system. For example, some communications systems and communication protocols are designed to tolerate a given level of error. While operation with error rates below this error tolerance level may yield improved performance, such improved performance is neither expected nor required to meet the system's or protocol's specifications. As such, effort or energy expended on obtaining performance better than this specified error could be expended for other purposes without jeopardizing the overall system performance.

In some implementations, the threshold SQP can specify the highest acceptable number of bit errors per unit time in the received data. In some other implementations, instead of being based solely on a bit error rate, the SQP can be a function of the signal-to-noise ratio (SNR) of received data and/or a measured bit error rate. The SQP threshold value can be experimentally determined and stored in memory at the receiver. Alternatively, the SQP threshold can be configured by a system administrator, system designer, system integrator, or hardware manufacturer. To meet performance specifications, operation at a current measured SQP value which is below the threshold SQP value is desired. An SQP margin can be represented by the difference between the threshold SQP value and the measured SQP value (e.g., SQP margin=SQP threshold value−measured SQP value).

A positive SQP margin can indicate that the signal quality of the received data is higher than the specified-for signal quality. As indicated above, this excess signal quality can be traded off for reduction in power consumption at the receiver, the transmitter, or both, without unduly impacting overall system performance. A negative SQP margin, on the other hand, can indicate that the signal quality of the received data is less than the specified-acceptable signal quality. In some implementations, one or both of the transmitter and the receiver can employ additional measures for improving the signal quality of the received data (perhaps at the cost of increased power consumption) so that the signal quality of the received data meets the specified signal quality threshold. Thus, measuring the signal quality of the received data can allow for the regulation of the power consumption of the communication system to meet a specified signal quality level, while saving power that might otherwise be expended on unnecessarily high signal quality.

Figure 5:
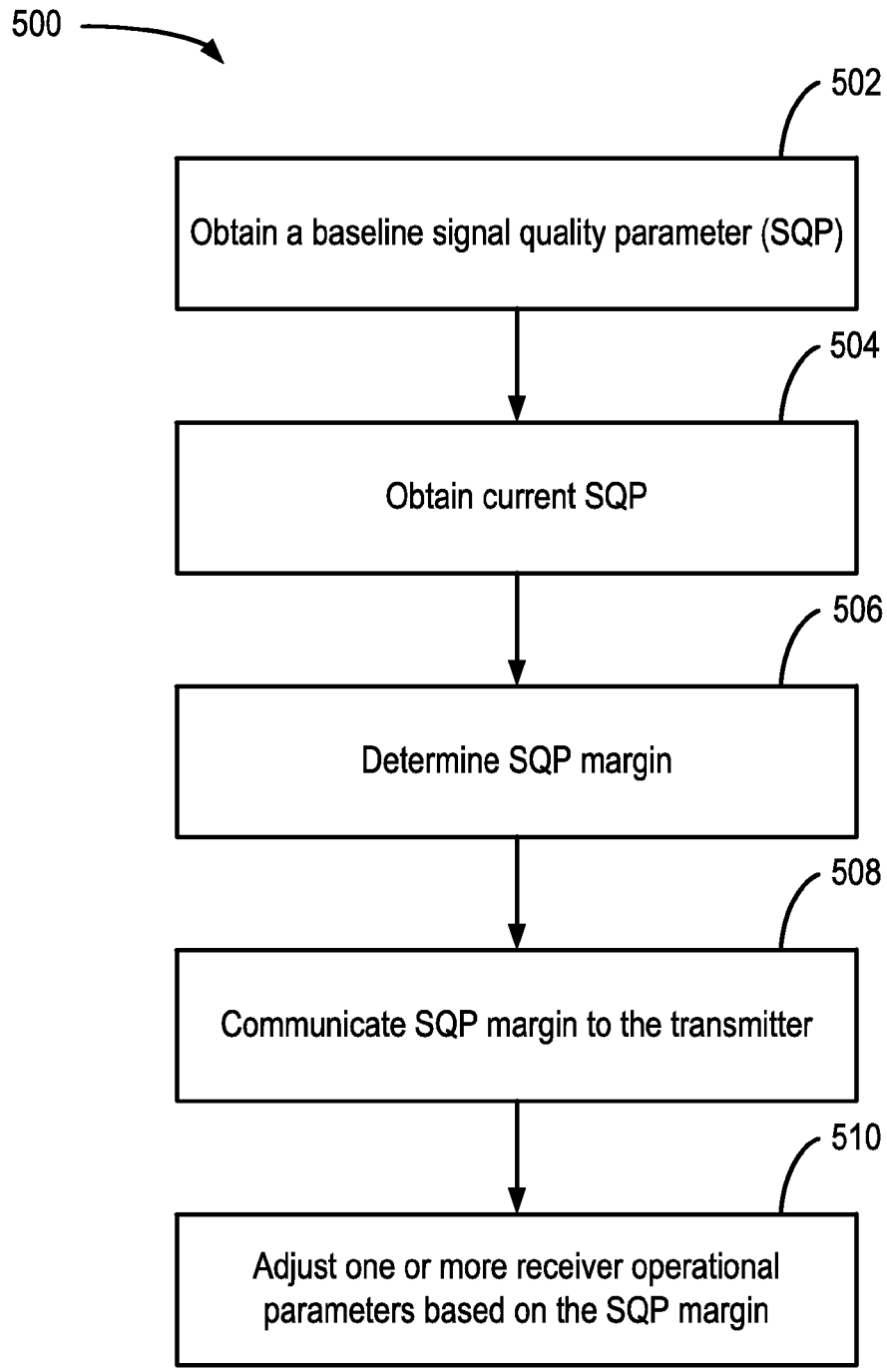
FIG. 5 shows an example process for adjusting the power consumption of a communication system.

FIG. 5 shows an example process 500 for adjusting the power consumption of a communication system. The process 500 can be executed by the receiver, and in particular, by the receiver power control module 312 of the receiver 300 shown in FIG. 3. The process 500 includes obtaining a threshold signal quality parameter (SQP) (stage 502), obtaining the current SQP at the receiver (stage 504), determining the SQP margin (stage 506), communicating the SQP margin to the transmitter (stage 508), and adjusting one or more receiver operational parameters based on the SQP margin (stage 510).

Referring to FIGS. 3-5, the process 500 includes obtaining a threshold SQP (stage 502). As discussed above, in some implementations, the threshold SQP value can be pre-determined and stored in the memory at the receiver. In some implementations, the threshold SQP value can indicate the highest acceptable number of bit errors per unit time in the received data. The receiver power control module 312 can obtain the threshold SQP value from the memory at the receiver 300. In some implementations, the threshold SQP value can be obtained from a network control device, such as software defined network (SDN) network controller.

The process 500 also includes obtaining the current SQP at the receiver (stage 504). As discussed above in relation to the process 400 shown in FIG. 4, the power control module 312 and/or the error correction decoder 310 of the receiver 300 can measure the current SQP associated with the received data. For example, the measured SQP value can be a ratio of the number of bit errors identified in the received data over a time period T, or some other function thereof.

The process 500 further includes determining the SQP margin (stage 506). As discussed above, the receiver power control module 312 can determine the SQP margin by determining the difference between the threshold SQP value and the measured SQP value. The SQP margin can indicate the extent by which the signal quality of the received data exceeds a pre-determined acceptable signal quality.

The process 500 also includes communicating the SQP margin to the transmitter (stage 508). In some implementations, the SQP margin determined at the receiver can be communicated to the transmitter transmitting the received data so that the transmitter can utilize the SQP margin to adjust transmitter operational parameters. For example, in some implementations, the receiver power control module 312 shown in FIG. 3 can communicate the SQP margin to the transmitter power control module 216 shown in FIG. 2. In some implementations, the receiver can communicate the SQP margin to the transmitter using an out-of-band communication channel. In some other implementations, the out-of-band communication channel can be a communication system management channel. For example, in some implementations, the out-of-band communication channel can be similar to the first and the second out-of-band communication links 120 and 122 shown in FIG. 1. In some implementations, the receiver can communicate the SQP margin using an in-band communication channel, such as an in-band management channel.

The process 500 also includes adjusting one or more receiver operational parameters based on the SQP margin (stage 510). As discussed above in relation to the receiver 300 shown in FIG. 3, the receiver power control module 312 can send control signals to various components of the receiver to alter one or more operational parameters of the receiver. In some implementations, if the SQP margin is positive, i.e., the signal quality of the received data is better than the specified signal quality level, the receiver power control module 312 can reduce the power consumption of one or more components of the receiver 300 at the expense of excess signal quality. On the other hand, if the SQP margin is negative, i.e., the signal quality of the received data is worse than the specified signal quality level, then the receiver power control module 312 can improve the signal quality at the expense of increasing the power consumption of the receiver 300.

For example, in some implementations, the receiver power control module 312 can send control signals to the ADC 304 to reduce the sampling rate of the ADC 304 and/or the number of bits utilized for quantizing the sampled voltage. The reduction in the sampling rate of the ADC 304 and/or the number of quantization bits used can reduce the power consumption of the ADC 304. While doing so may reduce the signal quality of the received data, such measures are taken in response to a determination that the received signal has signal quality to spare. Similarly, the receiver power control module 312 can improve the signal quality of the received data by increasing the sampling rate and/or the number of bits used for quantizing the sampled voltage at the expense of increased power consumption.

The receiver power control module 312 can adjust the number of taps utilized by the FIR filters used by the post-equalization module 306. For example, for a positive SQP margin, the receiver power control module 312 can reduce the number of taps utilized by the FIR filter so that the power consumption of the post-equalization module 306 is reduced. On the other hand, for a negative SQP margin, the receiver power control module 312 can increase the number of taps to improve signal quality at the expense of increased power consumption.

The receiver power control module 312 can also control the operational parameters of the error correction decoder 310 to adjust the power consumption and the signal quality of the received data at the receiver. For example, in some implementations, the receiver power control module 312 can reduce power consumption of the error correction decoder 310 by instructing the error correction decoder 310 to utilize an HD algorithm instead of an SD algorithm for decoding the received data. On the other hand, for a negative SQP margin, the receiver power control module 312 can improve the signal quality by instructing the error correction decoder to utilize an SD algorithm for decoding the received data at the expense of increased power consumption. In some implementations, the receiver power control module 312 can reduce the power consumption of the error correction decoder 310 by reducing the number of iterations performed to decode iteratively decodable block encoded received data. On the other hand, for a negative SQP, the number of iterations performed by the error correction decoder 310 can be increased to improve signal quality at the expense of increased power consumption.

In some implementations, the receiver power control module 312 can utilize a receiver look-up-table (LUT) for determining which ones of the several operational parameters discussed above can be altered based on the value of the SQP margin. The receiver LUT can store a list of values for the SQP margins and, for each value of SQP margin, store a corresponding set of operational parameter values. The receiver LUT can be stored in memory at the receiver 300. The receiver power control module 312 can use the determined SQP margin (stage 506) to obtain the values of the corresponding set of operation parameters of the receiver. In some implementations, the receiver LUT can be experimentally determined.

While FIG. 5 shows communicating the value of the SQP margin to the transmitter (stage 508) before adjusting the one or more operational parameters of the receiver, in some implementations, the receiver power control module 312 may communicate the value of the SQP margin to the transmitter (stage 508) after adjusting the one or more operational parameters of the receiver (stage 510). For example, in some implementations, the receiver power control module 312 can re-measure a residual value of the SQP margin after modifying the one or more operational parameters at the receiver, and send the residual value of the SQP margin to the transmitter instead of the measured value of the SQP margin.

In some implementations, after communicating the measured value of the SQP margin to the transmitter (stage 508), the receiver power control module 312 can refrain from immediately adjusting one or more receiver operational parameters. Instead, the receiver power control module 312 can allow some time for the adjustments to the transmitter's operational parameters made by the transmitter to take effect, and then re-measure the value of the SQP margin. The receiver power control module 312 can then adjust one or more receiver operational parameters based on the re-measured value of the SQP margin.

As mentioned above, the receiver power control module can communicate the value of the SQP margin to the transmitter. In particular, the receiver power control module 312 can send the value of the SQP margin to the transmitter power control module 216 shown in FIG. 2. As discussed above in relation to the transmitter 200 shown in FIG. 2, the transmitter power control module 216 can control the operation parameters of one or more components of the transmitter 200. The transmitter power control module 216 can receive the value of the SQP margin, and based on this value, alter one or more operational parameters of the one or more components of the transmitter 200.

Figure 6:
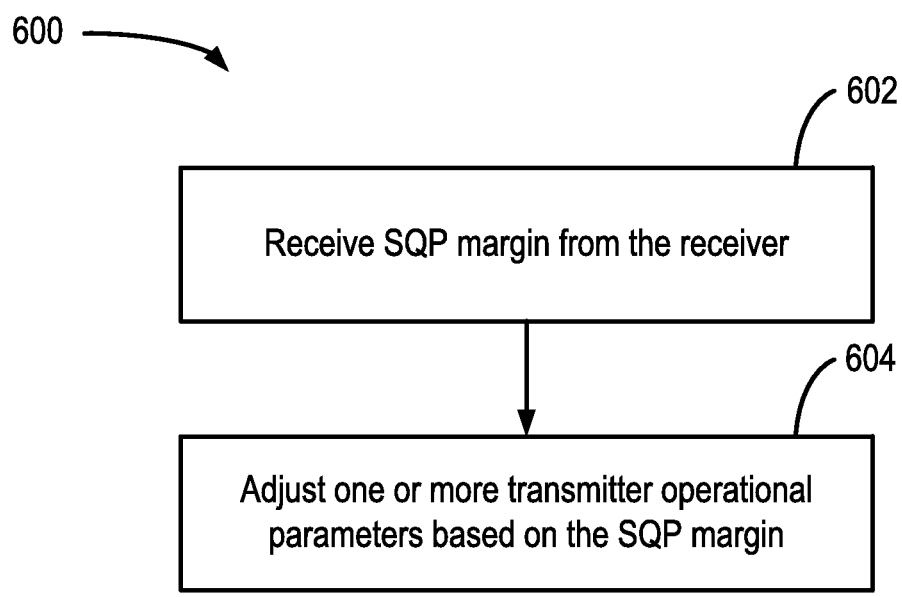
FIG. 6 shows another example process for adjusting the power consumption of a communication system.
Like reference numbers and designations in the various drawings indicate like elements.

FIG. 6 shows another example process 600 for adjusting the power consumption of a communication system. The process 600 can be executed by the transmitter, and in particular, by the transmitter power control module 216 of the transmitter 200 shown in FIG. 2. The process 600 includes receiving an SQP margin from the receiver (stage 602), and adjusting one or more transmitter operational parameters based on the received SQP margin (stage 604).

The process 600 includes the transmitter power control module 216 of the transmitter 200 receiving the SQP margin from the receiver (stage 602). As discussed above in relation to FIG. 5, the receiver can transmit the value of the SQP margin to the transmitter (stage 508). The value of the SQP margin, in some implementations, can be determined by determining the difference between a threshold SQP value and a measured SQP value. The SQP margin can indicate the signal quality of the received data in relation to a pre-determined acceptable signal quality. For example, a positive SQP margin can indicate that the signal quality of the data received at the receiver is above a threshold signal quality. On the other hand a negative SQP margin value can indicate that the signal quality of the data received at the receiver is below the threshold signal quality. The transmitter power control module 216 can adjust the operational parameters of one or more components of the transmitter 200 based on the value of the SQP margin, as discussed below.

In some implementations, the transmitter power control module 216 can alter the operational parameters of the error correction encoder 202 to reduce power consumption or to improve signal quality. For example, in some implementations, the transmitter power control module 216, in response to receiving a positive value for the SQP margin can in turn instruct the error correction encoder 202 to cease encoding data with error correction codes. Ceasing to encode the data can reduce the power consumption of the error correction encoder 202, sacrificing excess signal quality of the data received at the receiver. In some implementations, the transmitter power control module 216 can reduce power consumption by instructing the error correction encoder 202 to utilize HD algorithms, instead of SD algorithms for encoding the data. In some implementations, the transmitter power control module 216 can reduce power consumption by instructing the error correction encoder 202 to employ convolution codes instead of block codes for encoding data. Of course, the corresponding reduction in the power consumption may also sacrifice excess signal quality of the data received at the receiver.

On the other hand, in response to receiving a negative value for the SQP margin, the transmitter power control module 216 can adjust one or more operational parameters of the error correction encoder 202 to improve the signal quality at the expense of increased power consumption. For example, the transmitter power control module 216 can send control signals to the error correction encoder 202 to resume (if currently ceased) encoding the data with error correction codes. In some implementations, the transmitter power control module 216 can instruct the error correction encoder 202 to utilize SD algorithms, instead of HD algorithms, for encoding data to improve signal quality of the data received at the receiver.

Similarly, the transmitter power control module 216 can alter operational parameters of the pre-equalization module 206 to adjust power consumption and the signal quality of the data transmitted to the receiver. For example, in some implementations, the transmitter power control module 216 can reduce power at the expense of signal quality by powering down the pre-equalization module 206. In some implementations, the power consumption can be reduced by reducing the number of taps utilized by the FIR filters used in the pre-equalization module 206. On the other hand, the transmitter power control module 216 can improve signal quality at the expense of increased power consumption by powering up the pre-equalization module 206 and/or increasing the number of taps utilized in the FIR filters.

In some implementations, the transmitter power control module 216 can alter the operational parameters of the DAC 208. For example, in some implementations, the transmitter power control module 216 can reduce the sampling rate of the DAC 208 to reduce power consumption of the DAC 208 at the expense of reduced signal quality. On the other hand, the transmitter power control module 216 can increase the sampling rate of the DAC 208 to improve the signal quality of the data at the expense of increased power consumption.

In some implementations, the transmitter power control module 216 can reduce power consumption of the driver 210 by instructing the driver 210 to reduce the output voltage swing and/or the amplification factor of the driver, while, on the other hand, the to improve the signal quality of the transmitted signal the output voltage swing and/or the amplification factor of the driver 210 can be increased.

In some implementations, the transmitter power control module 216 can alter one or more operational parameters of the modulator 212 based on the value of the SQP margin. For example, the transmitter power control module 216 can reduce the amplitude of the current supplied to the laser diode to reduce the power consumption possibly at the expense of reduction in the signal quality. In some implementations, the transmitter power control module 216 can instruct the temperature controller 214 to reduce the power consumption by reducing the amount of cooing of the laser diode carried out by the temperature controller 214. Causing the temperature of the laser diode to fall outside a specified temperature range may reduce the signal quality of the data transmitted by the modulator. On the other hand, to improve signal quality the transmitter power control module 216 can increase the amplitude of the current supplied to the laser diode and/or instruct the temperature controller 214 to increase the amount of cooling offered to the laser diode at the expense of increased power consumption.

Similar to the receiver power control module 312, the transmitter power control module 216 can utilize a transmitter LUT for determining which ones of the several operational parameters of the transmitter 200 discussed above can be altered based on the value of the SQP margin. The transmitter LUT can store a list of values for the SQP margin and for each value of the SQP margin store a corresponding set of operational parameter values. The transmitter LUT can be stored in memory at the transmitter 200. The transmitter power control module 216 can use the value of the SQP margin received from the receiver to obtain the values of the corresponding set of operational parameters of the transmitter. In some implementations, the transmitter LUT can be experimentally determined.

In the examples shown in FIGS. 5 and 6, the receiver power control module 312 communicates the SQP margin to the transmitter (stage 508) and utilizes the same SQP margin to adjust one or more operational parameters at the receiver 300. At the transmitter 200, the transmitter power control module 216 also receives the SQP margin (stage 602) and utilizes the same SQP margin to adjust one or more operational parameters at the transmitter 200. Accordingly, the receiver LUT and the transmitter LUT can include appropriate values for the operational parameters to account for concurrent adjustments being made to the operational parameters of both the receiver 300 and the transmitter 200.

In some other implementations, the receiver power control module 312 can communicate the current measured value of the SQP, instead of or in addition to the SQP margin, to the transmitter. In some such implementations, the transmitter control module 216 can determine the value of the SQP margin by determining the difference between the received measured SQP value and a threshold SQP value. In some implementations, the threshold SQP value utilized by the transmitter control module 216 can be equal to the threshold SQP value utilized by the receiver control module 312, discussed above, for determining the SQP margin. In some other implementations, the transmitter control module 216 can utilize a threshold SPQ value that is different from that utilized by the receiver control module 312.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. An optical communication system comprising:
an optical transmitter communicably coupled to an optical link, configured to:
transmit data over the optical link,
receive a signal quality parameter (SQP) value indicating a signal quality of the data transmitted over the optical link,
determine a value of an SQP margin based on the difference between the received SQP value and a threshold SQP value, and
based on the value of the SQP margin, select one or more operational parameters from a plurality of operational parameters of the optical transmitter and the corresponding values of the operational parameters to reduce power consumption of the transmitter in response to the received SQP value; and
an optical receiver communicably coupled to the optical link, configured to:
receive data transmitted by the transmitter over the optical link,
generate the SQP value, and
communicate the SQP value to the optical transmitter.

2. The system of claim 1, wherein the optical receiver is configured to communicate the SQP value to the optical transmitter using an out-of-band communication channel.

3. The system of claim 1, wherein the optical receiver is configured to dynamically adjust one or more operational parameters of the optical receiver to reduce power consumption in response to the generated SQP value.

4. The system of claim 1, wherein the optical transmitter is configured to transmit data over the optical link by encoding the data using a forward error correction code, and the optical receiver is configured to generate the SQP value based on a number of errors detected in the received data.

5. The system of claim 1, wherein the optical transmitter is configured to select the one or more operational parameters and their corresponding values from a look-up-table entry corresponding to the value of the SQP margin.

6. The system of claim 1, wherein the selected one or more operational parameters of the optical transmitter can include a laser temperature control voltage/current level.

7. The system of claim 1, wherein the selected one or more operational parameters of the optical transmitter can include a pre-equalizer tap length.

8. The system of claim 1, wherein the selected one or more operational parameters of the optical transmitter can include an operating mode of a forward error correction code encoder.

9. A method for dynamically adjusting one or more operational parameters of a communication system including a transmitter and a receiver communicating over a communication link, comprising:
transmitting data from the transmitter to the receiver over the communication link;
receiving at the transmitter a signal quality parameter (SQP) value from the receiver indicating a signal quality of the data transmitted over the communication link;
determining a value of a SQP margin based on the difference between the received SQP value and a threshold SQP value; and
selecting, at the transmitter, based on the SQP margin one or more operational parameters from a plurality of operational parameters of the transmitter and the corresponding values of the operational parameters to reduce power consumption of the transmitter in response to the received SQP value.

10. The method of claim 9, wherein receiving at the transmitter a SQP from the receiver indicating a signal quality of the data transmitted over the communication link includes receiving the SQP value via an out-of-band communication link.

11. The method of claim 9, wherein transmitting data from the transmitter to the receiver over the communication link includes encoding the data using a forward error correction code and transmitting the encoded data to the receiver, and wherein receiving at the transmitter a signal quality parameter (SQP) value from the receiver indicating a signal quality of the data transmitted over the communication link includes receiving the SQP value indicating a number of errors detected in the data received at the receiver.

12. The method of claim 9, wherein selecting, at the transmitter, based on the SQP margin one or more operational parameters from the plurality of operational parameters of the transmitter and the corresponding values of the operational parameters to reduce power consumption of the transmitter in response to the received SQP value includes identifying the one or more operational parameters based on a look-up-table entry corresponding to the determined value of the SQP margin.

13. The method of claim 9, wherein selecting, at the transmitter, based on the SQP margin, one or more operational parameters from a plurality of operational parameters of the transmitter and the corresponding values of the operational parameters to reduce power consumption of the transmitter in response to the received SQP value includes selecting a value for a laser temperature control voltage/current to reduce the power consumption of the transmitter.

14. The method of claim 9, wherein selecting, at the transmitter, based on the SQP margin, one or more operational parameters from a plurality of operational parameters of the transmitter and the corresponding values of the operational parameters to reduce power consumption of the transmitter in response to the received SQP value includes selecting a value for a pre-equalizer tap length.

15. The method of claim 9, wherein selecting, at the transmitter, based on the SQP margin, one or more operational parameters from a plurality of operational parameters of the transmitter and the corresponding values of the operational parameters to reduce power consumption of the transmitter in response to the received SQP value includes selecting an operating mode of a forwarding error correction code encoder.

16. A method for dynamically adjusting one or more operational parameters of a communication system including a transmitter and a receiver communicating over a communication link, comprising:
- transmitting data from the transmitter over the communication link;
- receiving at the receiver the data transmitted over the communication link;
- determining at the receiver a signal quality parameter (SQP) value indicating a signal quality of the data transmitted over the communication link;
- receiving at the transmitter the SQP value from the receiver;
- determining a value of a SQP margin based on the difference between the received SQP value and a threshold SQP value;
- selecting, at the transmitter, based on the SQP margin one or more operational parameters from a plurality of operational parameters of the transmitter and the corresponding values of the operational parameters to reduce power consumption of the transmitter in response to the received SQP value; and
- dynamically adjusting, at the receiver, one or more operational parameters of the receiver to reduce power consumption of the receiver based on the SQP value.

17. The method of claim 16, wherein receiving at the transmitter the SQP from the receiver includes receiving the SQP via an out-of-band communication link.

18. The method of claim 16, wherein dynamically adjusting at the receiver one or more operational parameters of the receiver to reduce power consumption of the receiver based on the SQP value includes dynamically adjusting one or more of a sampling rate of an analog-to-digital converter, a post-equalizer tap length, and an operating mode of an error correction code decoder.

19. The method of claim 16, wherein selecting, at the transmitter, based on the SQP margin one or more operational parameters from a plurality of operational parameters of the transmitter and the corresponding values of the operational parameters to reduce power consumption of the transmitter in response to the received SQP value includes selecting a value of a laser temperature control voltage/current.

20. The method of claim 16, wherein determining at the receiver a signal quality parameter (SQP) indicating a signal quality of the data transmitted over the communication link includes determining a number of errors detected in the data transmitted over the communication link.

* * * * *